United States Patent [19]

Hechler, IV

[11] 3,933,179
[45] Jan. 20, 1976

[54] WATER AND CONCENTRATE SUPPLY VALVES FOR PROPORTIONING MIXER-DISPENSER

[76] Inventor: Valentine Hechler, IV, 26 Meadow View, Northfield, Ill. 60093

[22] Filed: Feb. 27, 1974

[21] Appl. No.: 443,831

[52] U.S. Cl. ............... 137/635; 137/604; 239/310; 239/414
[51] Int. Cl.² ......................................... F16K 19/00
[58] Field of Search.................... 137/607, 604, 635; 239/414, 415, 310, 317, 318

[56] References Cited
UNITED STATES PATENTS

| | | | |
|---|---|---|---|
| 1,940,268 | 12/1933 | Peterson | 239/415 |
| 2,568,444 | 9/1951 | Giuliano | 137/635 |
| 3,167,090 | 1/1965 | Booth et al. | 137/604 |
| 3,698,644 | 10/1972 | Nystuen | 239/318 |

Primary Examiner—Robert G. Nilson
Attorney, Agent, or Firm—Watson D. Harbaugh

[57] ABSTRACT

A portable mixing-dispensing device having a manual flow control valve means between a ventable flow control chamber and a solution-proportioning chamber, and a manual feed valve between the proportioning device and a source of concentrate supplied at a negative gauge pressure, same including means to selectively coordinate the operation of the valves. The feed valve serves also as an anti-backflow check valve for the concentrate supplied under a negative gauge pressure as well as maintaining the prime thereof without dilution when concentrate is not being supplied to the mixing chamber. A translucent concentrate supply tube readily visible from above the mixing chamber serves as a visual check as to the prime of the concentrate.

10 Claims, 9 Drawing Figures

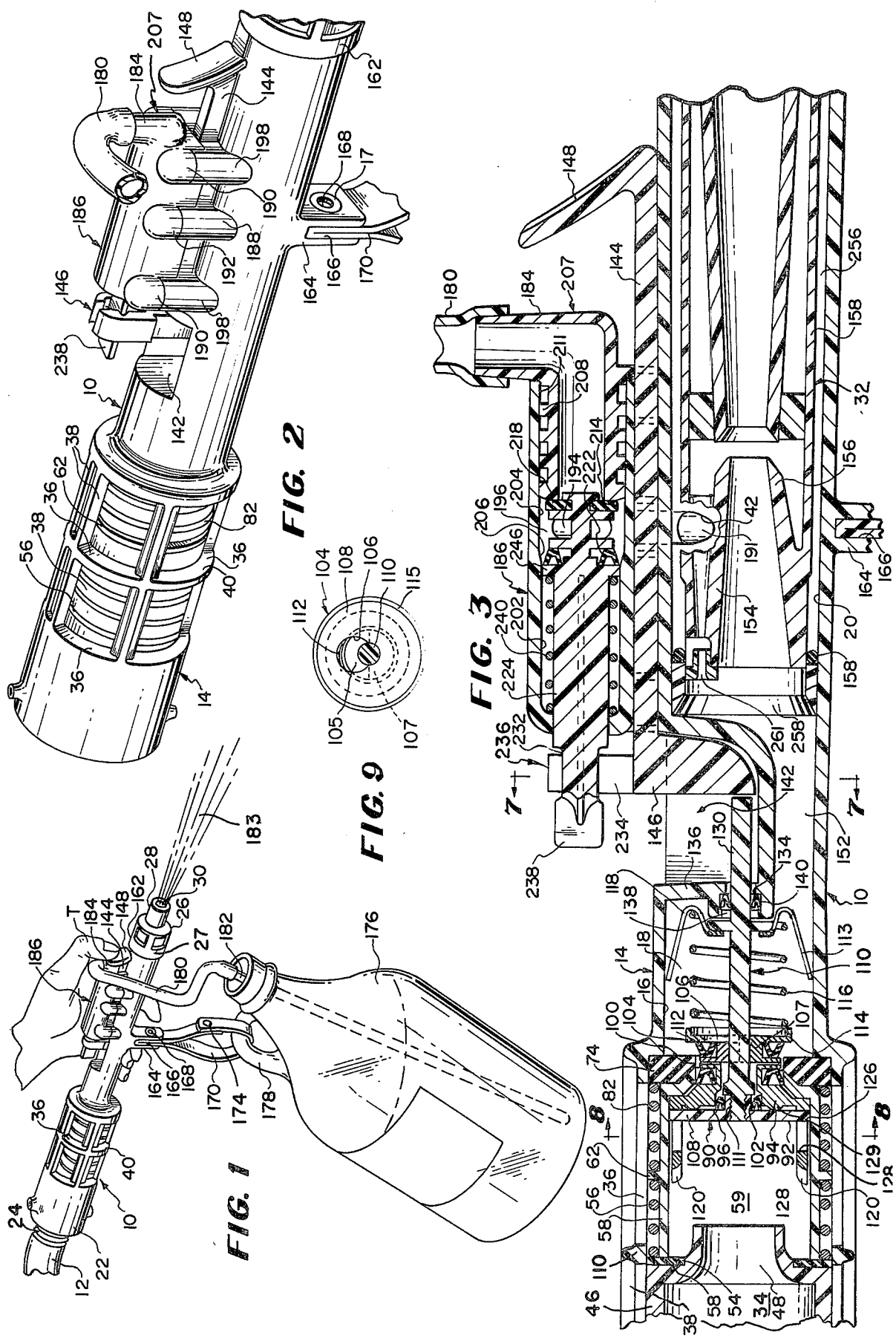

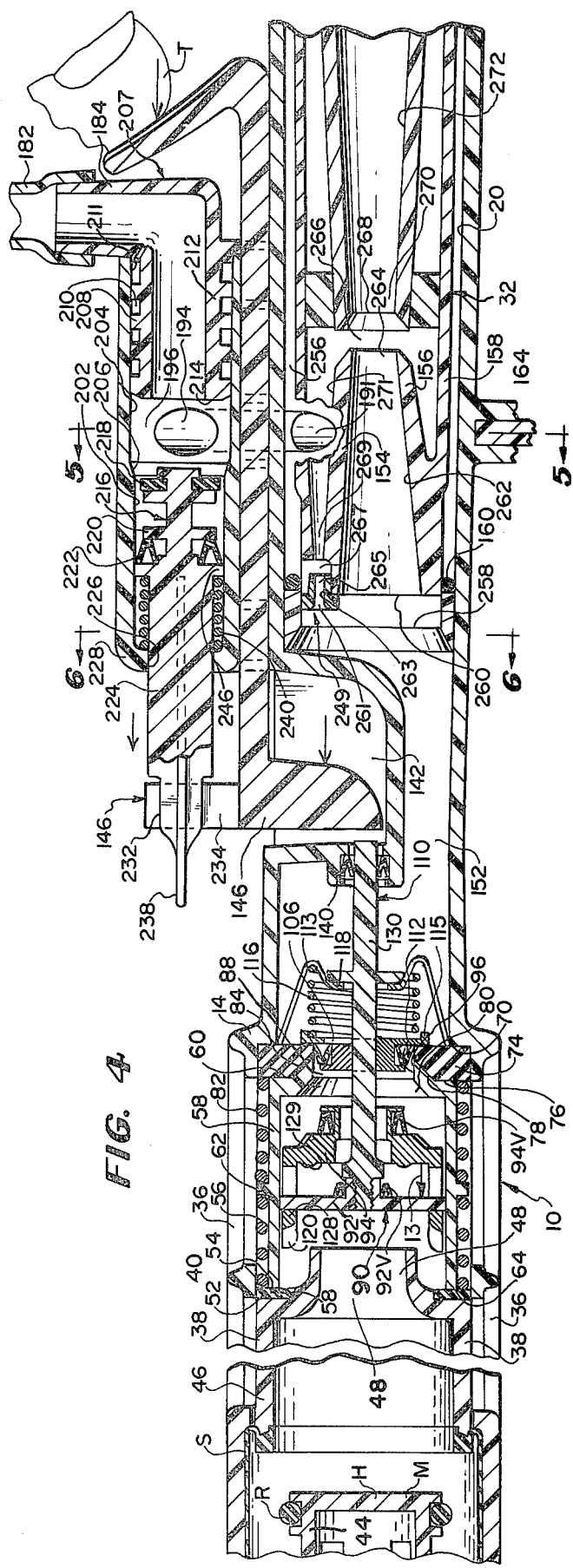

WATER AND CONCENTRATE SUPPLY VALVES FOR PROPORTIONING MIXER-DISPENSER

CROSS-REFERENCE

Hechler, Ser. No. 418,899 filed Nov. 26, 1973 now U.S. Pat. No. 3,862,640.

Hechler, Ser. No. 333,309 filed Feb. 16, 1973, now abandoned.

BACKGROUND OF INVENTION:

In providing an anti-back-siphoning apparatus between a municipal water supply outlet and a solution mixing and dispensing device as described in the Hechler application, a manual flow control valve is provided between a plurality of chambers in tandem, one housing anti-backflow valves and vents and the other a proportioning-mixing device. The valve manually cuts off water supply and backflow of mixture while the vent valves automatically vent to atmospheric pressure when the water pressure drops to a critical low positive gauge pressure. Furthermore, since the mixture discharge orifice is continuously open to atmosphere, the venting should not only stop backflow contamination, but close backflow check valves at the water and concentrate inlets to the mixing device to prevent flow in either direction independently or any applied negative gauge pressure that remains on the concentrate that may be induced by gravity. Mixture still in the device can backflow and dilute the concentrate under the slight negative gauge pressure induced by gravity. Accordingly, means are desired to also prevent possible dilution and occasional loss of prime of the concentrate. Predominately, however, there are many occasions when it is repeatedly desirable to immediately alter operation and dispense pure water selectively as a wash between applications of the solution, or, apply a solution after a wash.

Furthermore, different chemicals may be dispensed through the device which are not compatible with the valve seals previously used and these should be capable of being readily flushed and changed.

SUMMARY OF PRESENT INVENTION:

Although the present invention can be used without a nozzle for soft flow, or with a nozzle for a hard stream discharge, it is mobile and rendered capable of selectively discharging plain water, or a wide variety of chemical solutions, in any desired pattern and orientation. It is illustrated with a nozzle, and not only includes cut-off valves that are activated while there is still an outflow of water under pressure that prevents contamination of a municipal water supply system, but also vent valves that open to atmosphere before the pressure drops to zero gauge pressure which might develop due to a break or vacuum occurring in the municipal water supply system.

The outlet from a water chamber to a mixing chamber to a mixing chamber is controlled preferably by a two-step, manually-opened, pilot and main valve assembly which opens sequentially and then become united by the Bernoulli effect when opened to thereby provide an unrestricted full flow condition. They close as a single valve with a snap action. The self-closing is rendered manually inoperative when the water chamber is vented to atmosphere and the inflow cut-off valve is closed. The invention embodies a concentrate supply valve that is selectively actuatable simultaneously with the manual flow control valve which when closed prevents a mixing operation, and also prevents backflow of mixture or concentrate as well as drip at the nozzle when the device is idle. Preferably, a small auxiliary chamber of concentrate is provided at the inlet of the proportioning mixer to provide a volume of concentrate for immediate supply and from which concentrate backflow may occur before a dilution becomes a danger if there is slight delay in manually closing the concentrate valve as upon the rare occasion when the main valve might be held open for a moment after the anti-backflow water system is actuated automatically while dispensing a solution.

On the other hand, a backflow of the concentrate when manually opening the concentrate valve alone, or a disconnection of the concentrate supply tube will permit a rapid emptying of the auxiliary chamber for a flush-out. Then when empty, the nozzle opening can be obstructed and fresh water under pressure can flow back through the parts contacted by concentrate and purge them either for use of another chemical or storage. The concentrate valve seals are readily replaceable, it being appreciated that no elastomeric seal will serve both fertilizers and insecticides without deterioration by one of them. Otherwise, the concentrate lift height, and consequently the backflow effort of the concentrate, is negligible within ounces and substantially constant because it is aspirated only a short height directly to the jet pump concentrate inlet.

The above advantages are attained and the mixing is substantially free of any wide pressure differentials between atmospheric pressure at the nozzle outlet and the pressure of the concentrate at the mixer inlet as related to gravity. The concentrate eduction conduit is quite large in size and flexible to maintain both flow friction and momentary surge effects or drop of operational pressure that would occur with repeated decelerating, starting and accelerating concentrate flow each time the dipensing operation is repeatedly initiated and stopped.

Also heretofore, a proportioning and mixing with a hoped for constancy of a solute supply in a siphon-type sprayer has involved subjecting the solute to a deep vacuum and then controlling the flow so that variation in the lift height is minimized. However, the degradation of resulting mixture ratios is over a wide range, as much as ±40%, particularly with pressure variations upon the solvent. The pressure efficiency varies 50% due to the vacuum created load thereon and metered flow. Industry has lived with such a wide inaccuracy as acceptable since no assured greater accuracy has been heretofore accomplished, except by direct volumetric measuring, mixing and then dispensing.

In the present invention, as already mentioned, a chamber or gap is provided between a solvent jet nozzle and a larger receiving opening aligned therewith, both of which are smaller than the gap area; and as noted in the Hechler application, the mixing means preferably is a two-stage jet pump in which converging walls leading to jet nozzles convert pressure on the water to jet flow energy in a direct proportion at a predetermined low pressure, approximately zero gauge pressure. The resulting jets are directed across gaps having a concentrate flowing to them at or just below gauge pressure and into substantially short cylindrical pump chambers having a larger flow potential than the nozzle. Thus, just beyond the receiving opening the pressure is at the same slight pressure drop with little, if any, loss of energy that is conventionally required in lifting the solute under conventional deep vacuum conditions.

The jetting water molecules transfer energy in proportion to their jet strength to entrain molecules of the concentrate in the gap and pump cylinder in relation to the differential in their relative cross-sectional sizes to provide predetermined proportioning ratios. Therefore, the relative sizes of the nozzle and receiving opening can determine the ratio directly in relation to solvent pressure-rate of flow condition at the gap and their overall sizes determine the volume.

Thereafter, the energy of the mixture is reconverted to a positive pressure and the mixture conducted at a pressure to a second stage where it serves as the solute. Here, again, the pressure on the solvent is converted to jet energy at a pressure present in the second stage gap, the diluted solute is entrained and mixed with solvent, and the energy reconverted to an output working pressure. The ultimate mixture solution can be discharged as a soft flow, or, if a hard flow is desires, the mixture is driven at least in the final stage through expanding walls to reconvert the jet energy back to pressure for ultimate dispensing through a dispensing nozzle having a flow area substantially less than the water flow area ahead of the jet pump.

With greater efficiency a substantially constant dilution ratio can be provided with jet pumps in tandem as where the first stage ratio is determined and the output of this stage is supplied to the second stage to ultimately dispense a highly uniform solution. Such ultimate ratios can be maintained rather accurately well within a 10% range over an expected municipal water pressure range of 25 to 80 p.s.i.g. Any ratio degradation is essentially confined to what may occur in the first stage where the most stable ratio can be provided. This is particularly true with the location of the concentrate supply level being close to the level of the jet pump. The cylindrical pumping chamber is long enough to deliver maximum energy exchange, yet short enough to minimize liquid flow skin friction along the cylindrical surface. Beyond the pumping cylinders the walls diverge slightly enough to reduce potential surface flow friction along the expanding walls.

A further object of the invention is to provide a dual flow control valve arrangement in a space having valve chamber which is easy to open sequentially as by a pilot valve which substantially equalizes pressures on opposite sides of the main valve for it to initially open. The diameters of the two valves are approximately the same to establish a Bernoulli effect between them whereby the main valve is then drawn quickly against the pilot valve to provide a more than wide open single type valve effect for full flow with minimum pressure drop and when closing the valves close as a unit with a quick action.

Other and further objects and advantages will appear from the description that follows relating to the drawings herein.

IN THE DRAWINGS:

FIG. 1 is a perspective view of the device embodying the invention as manipulated in use and operation;

FIG. 2 is an enlarged perspective view of the device itself in the resting fully vented condition and valves in no-flow positions;

FIG. 3 is a longitudinal cross section on a vertical plane through the gun-handle portion of equipment shown in FIG. 2;

FIG. 4 is a sectional view like FIG. 3 showing the device when manually actuated and the valves are disposed ready for full liquid flow;

FIG. 5 is a section taken on line 5—5 of FIG. 4;

FIG. 6 is a section taken on line 6—6 in FIG. 4;

FIG. 7 is a section taken on line 7—7 in FIG. 3;

FIG. 8 is a section taken on line 8—8 of FIG. 2; and

FIG. 9 is a downstream view of the back flow check valve assembly.

Reference is hereby made to said Hechler patent for the Figs. showing the structure and other operative positions of the solvent vent valves.

DESCRIPTION OF A PREFERRED EMBODIMENT:

The invention will be described as related to the utilization of municipal water pressure as a solvent for selectively disposing either a solvent and solute as a proportional solution, or, of solvent alone as a wash, and, further contemplates selective interchangeability of elastomeric seals for fertilizers or insecticide concentrates as the solute.

Referring now to the drawings and to the description in said Hechler application, reference to which is hereby made:

VENTING WATER RECEIVING CHAMBER WHILE STILL UNDER PRESSURE

The representative embodiment is illustrated as a manually controlled proportioner-mixer-dispenser gun 10 connected to the outlet of a garden hose 12 to utilize municipal water as a source of solvent under a municipal water pressure ranging from 15 to 100 p.s.i.g. The gun is constructed to safeguard against backflow contamination of the water source by any solution remaining undispensed in the device in event the water pressure drops below a predetermined low gauge pressure, as determined by an automatic self-acting resilient means. The device is vented wide open to atmosphere when the pressure drops below approximately 4 p.s.i.g. well before possible vacuum is effective at the water inlet of the device. Thus, until zero p.s.i.g. is reached, backflow is prevented by forward flow pressure of fresh water while the device becomes fully vented and drained before the time that zero p.s.i.g. water pressure is reached. Above 10 p.s.i.g. the device attains and maintains its ready-to-operate condition for both constant and an intermittent dispensing, as controlled by the manual flow control valve, with or without concentrate as controlled by a concentrate valve selectively linked to the manual flow control valve.

GENERAL CONSTRUCTION

Referring now to FIGS. 1, 2 and 3, a unitary housing 14 is molded of a plastic and has an elongated compartment 16 therethrough with internal cylindrical walls defining chambers 18 and 20 at opposite ends for ease and orientation of assembly. Its inlet end 22 receives an hose adapter for securement in sealed relation with an outlet main fitting 24 that is conventionally provided on a garden hose 12 and opens into the valve chamber 18. The outlet end 26 of the housing is externally threaded with an unconventional thread 27 or a castellated keying system to receive only an intended unique outlet fitting, such as a nozzle 28, that preferably is open continuously for discharge to atmosphere, as at 30, form a jet pump unit 32. The chambers 18 and 20 are connected by a flow passageway 34. Proximate to its inlet opening 22, the valve chamber housing wall portion 18 is provided with large longitudinal vent openings 36 bordered by reinforcement ribs 38 and an intermediate flange 40 to guide reciprocating parts therein. Concentrate supply opening means 42 are provided to the pump chamber 20 through that wall portion of the housing.

VALVE VENTING

The valve and venting means in chamber 18 is more particularly described in said Hechler patent and includes an adapter that internally supports a windowed mandrel M having a valve head 44 carrying an O-ring R. Coacting therewith is a snorkel valve member 46 that is slidable upon the inner edges of the ribs 38, as located upstream of the vent openings 36, and as internally sealed by a rolling seal S that seals the upstream side of the snorkel from the vent openings.

Beyond the upper limit of movement of the valve head H, the snorkel 46 narrows to terminally define a throat 48 which can be of selected size to determine the flow capacity of the device. Marginally outward therefrom the effective valve area of the snorkel 46 is determined by the shoulder at 52 to receive a ring seal 54 fitted thereon, as held in place by a spring 56.

Downstream from the snorkel 46 is disposed a sleeve-type multiple valve member 58 defining a shoulder 60 for one valve element, and reciprocably mounted in the housing 14, as slidably guided by an external flange 62 with the upstream end edge 64 coacting as a valve seat with the snorkel seal 54 to serve as a vent valve 66. The spring 56 between the seal 54 and flange 62 urges separation of the elements of the vent valve 66 at said low pressure, as described.

Downstream of the sleeve valve member 58 the housing 14 is reduced in diameter to provide a shoulder 70 facing upstream against which a valve member partition 74 rests at the downstream end of the vents 36. The partition defines a flat valve seat 76 that is engaged by the shoulder 60, as squared by the conical taper 78 and the cone 80 resting therein. A compression spring 82 interconnecting the partition 74 and the downstream side of the flange 62 on the sleeve 58 urges separation of the sleeve from its conical-guided valving contact with the partition member 74 to act as a vent valve at 84 and to provide an enlarging second chamber 86 vented through the vent opening 36 when these valve members separate.

Adjacent its downstream end the inner wall of the sleeve valve member 58 defines an inwardly tapered valve seat and stop 88 (FIG. 4) that coacts with the control valve assembly 90 as a valve and a stop concentrically therewith in guided relation. The assembly 90 comprises a pilot valve 92 and a main valve 94 and the taper 88 ends in a cylindrical valve seat or port 96 for the main valve 94. V-rings 92V and 94V are mounted to coact in sliding relation with respect to the ports of the pilot valve 92 and main valve 94. The V-ring 94V on the main valve 94 coacts with the cylindrical port 96 on the sleeve when in closed position and the pilot valve 92 is threaded onto the enlarged end of the stem 110 to coact with an internal cylindrical wall seat 102 in the head of the main valve 94. As later described a check valve 104 carries a V-ring 104V that coacts with the cylindrical port 100 in the partition 74.

The valves are constructed and arranged to function as follows: to provide a lost motion between the control valve assembly 90 and the sleeve valve 58; to provide a take-up between the valve assembly and the sleeve valve 58; to provide lost motion for the main valve 94 to move against the pilot valve 92 in the direction of the arrow 13 when open and solvent is flowing under pressure to further prevent the pilot valve being actuated by the manual control when the chambers are vented; then when the backflow check valve closes, to establish the chamber 86 between it and the main valve 94 which is vented through the vent valve 84.

More particularly, the pilot valve 92 preferably is an integrated part of the stem assembly 110, as secured by threads 111, and limits the venting movement of the sleeve valve 58 so that the snorkel 46 can move farther and break contact therewith for opening the vent valve 66.

The check valve 104 is slidable on the stem assembly and is assembled in position over the enlarged end of the stem 110 before the pilot valve is installed. For this purpose a stop disk 108 has an off-center large hole 106 that receives the said enlarged end therethrough and is provided with a hub 107 that slides along the stem 110 in a close but frictionless relation. The hub is radially segmented on the side of the hole 106 to provide a member 105 that is slipped like a key into position to hold and be held in place by a V-ring 112 after the assembly of the valve on the stem.

The check valve 104 is urged to its closed position by a spring 116 engaging disk 108 radially inside a reinforcing flange 115. Downstream of the check valve 104 a cradle 118 fitted integrally with the stem 110 supports the other end of the spring 116 whereby it urges the main valve and check valve assemblies towards each other and thereby to their closing positions to close at least one of the cylindrical ports 96 and 100. If adequate water pressure is present proper mixing and main valve 94 is not actuated manually the main valve will be closed. With the above condition but with the main valve manually held open the check valve 104 will be opened by flow. If water pressure is not present that is adequate for proper mixing the pilot valve may be opened (FIG. 4) to an extent limited by legs 113 on the cradle 118 engaging the partition 74. The water chamber is vented and the check valve 104 will be closed.

The upstream margins of the pilot valve 92 overlap the main valve body 94 (FIG. 8) with a disk portion 108 to displace the pilot valve stem 110 and remove it from possible engagement with the manual actuator 144 when the device is fully vented and the check valve 104 is closed in the partition member 74.

The main valve 94 is provided marginally with integrally molded axial bosses 120 (FIG. 8) that are diametrically opposite and are radially slotted to provide guide arms 122, or tracks, extending axially upstream. The arms are longitudinally slotted at 124 over a portion of their length so that the remote end thereof serves as a stop 128 (FIG. 3) to engage radial ears 126 on the pilot valve and limit the lost motion extension between the valves. Stops 129 at the inner end, or on the face of the main valve, space the two valves slightly to equalize water pressures on both sides of the pilot valve 92 over a major effective area thereof for greater ease in opening.

MANUAL CONTROL

The inner end 130 of the stem 110 extends in an axial direction through an opening 134 in a cross-wall portion 136 having a recess 138 carrying a V-ring seal 140 therein which seals the stem as terminally exposed to atmosphere in a housing recess 142.

As disclosed and described in Hechler Ser. No. 333,309, for manual actuation of the flow control valve assembly, a push rod 144 with a Tshaped head 146 thereof is reciprocably mounted on the housing 14 as later described to engage and manually actuate the valve stem portion 130 where it projects into the recess 142. The front end of the push rod 144 (FIGS. 1, 2 and 4) is reversely formed to provide a thumb handle 148 which transmits valve actuating pressure in a compound direction that also urges the rod 144 to slide in the channel 150 (FIG. 5).

A full flow passage from the solvent flow control and check valve is a U-shaped passage 152 around the recess 142 leading to the downstream chamber 20 of the compartment 16 which removably receives jet pumps 154 and 156 operating in tandem within a unitizing shell 158, for ready replacement, to handle different chemicals and proportions as terminally sealed by seals 160 and held in place by a collar 162 received on the end thread on the housing 14 to hold the nozzle 28 at the outlet end 26. The space around the jet pump assembly serves as a concentrate holding compartment.

CONCENTRATE SUPPLY

For the purpose of providing the constancy of the mixture ratio in the first stage, a depending stud 164 (FIG. 1) is provided which is crosskerfed at 166 and apertured at 168 to receive the fold end of a flexible looped hanger strip 170 secured thereto by a grommet 172. The strap at its free ends has a snap fastener 174 for receiving and supporting a conventional bottle 176 or container of concentrate solution depending therefrom close to its handle 178 for minimum lift height of the concentrate. The hanger 170 releasably engages the handle 178 of the bottle in supporting relationship and a translucent flexible tube 180 of fixed length is connected between a dip tube 182 in the bottle 176 and the nipple 184 on a valve unit 186 (FIG. 2) leading to the chamber 20 (FIG. 3).

As shown in FIG. 1, the assembly may be manipulated by one hand, either right or left, with the fingers around the housing 14 as a handle with a person's thumb T disposed in place to operate the flow valve push rod 144. Thereby, with the garden hose 12, hanger 170 and tube 180 being flexible, a person can manipulate, aim and direct the spray 183 in any direction or orientation without moving the bottle, and without materially changing the lift height other than conventionally to carry it as the operator moves from place-to-place.

CONCENTRATE FLOW CONTROL VALVE

Although the nipple 184 could lead directly to the chamber 20 and the dip tube 182 be attached and detached for intermittently dispensing water alone, contact of some insecticides and other concentrates with a person's skin can cause injury or be dangerous to life itself. It is preferred to valve the concentrate simultaneously with the water and, for this purpose, a valve unit 186 is located on top of the housing just rear of the main valve actuator thumb handle 148.

Although the valve unit or valve housing 186 (FIGS. 5 and 6) may be made integral with the housing 14, it is preferred to mold it separately and squeeze it into securement by tapered mating surfaces for permanent assembly.

For this purpose, two upstanding conduit nipples 188 are molded on the upper side of the housing 14, the latter being in taper sealed open communication through 191 with the mixing chamber 20 (FIGS. 3–7). Also for permanent securement, four upstanding hollow studs 190 are molded on the housing at the corners of the housing 186 (FIG. 6) and spaced to serve as lateral guides for the push rod 144. The valve housing 186 has molded on it L-shaped conduits 192 which press fit onto the nipples 188 in sealing relationship and open internally at 194 upon the wall of a valve chamber 196. Also molded on the housing 186 are bosses 198 defining tapered sockets 200 which frictionally grip onto the studs 190 to hold the nipples 188 in sealed relationship and guide the push rod 144. Preferably, the tapers are 2° tapers for radial physical seizure.

The valve chamber 196 has two cylindrical portions 202 and 204 of different diameters separated by a tapering shoulder 206. The larger portion 204 opens towards the front of the gun where it receives an L-member 207 whose inner end is of full housing diameter and flanged at 208 between grooves 210 assembled and rotatively sealed in the mouth 211 of the valve chamber under slight negative gauge pressure. The other end 212 serves as the nipple 184 that can be adjustably rotated over 180° from side-to-side for the convenient attachment of semi-transparent hose 180 where the prime of the concentrate can be visually checked at a glance. The inner end of the L-member 207 serves as a valve port land 214.

The concentrate openings 194 are disposed between the valve lead 214 and the shoulder 206. A spool-like valve member 216 carries at one end a poppet valve head 218 coacting with the port 214 as a cut-off valve. Spaced from the poppet valve 218 and slidably engaging the smaller portion 202 of the valve chamber at all times in sealed relation is a piston 220 carrying a V-ring seal 222 which confines communication between the L-member 207 and openings 194 to the larger chamber 204. The effective area of the piston 220 is substantially greater than the port area of the valve 214.

A valve stem 224 extends rearwardly out through an opening 226 in the rear end wall 228 of the valve housing and selectively coacts with the crosshead arm 234 to be latched thereto by rotary movement of the concentrate valve for either dispensing a mixture, if latched, or be unlatched from movement by the crosshead arm 234 of the push rod 144 for dispensing solvent alone. For this purpose, the neck 232 of the stem is reduced in size to pass freely between the opposing notched arms 234 of a forked member 236 the crosshead 234 on the yoke 146 while the end of the stem is widened to form a key-head 238 which interlocks beyond the cross-head for back and forth movement therewith. The head 238 is long enough that it cannot be turned for simultaneous operation unless the push rod is in fully closed position, although it can be released therefrom anytime. When quarter-turned, the stem interlocks with the arms for positive control movement therewith by the narrow portions of the neck 232 having cross ribs 247 spreading the arms 234 appreciably and snapping into grooves as at 248 on the opposing faces 250 of the arms 234 as shown in FIG. 7.

Thus for interlocking purposes, the end of the key 238 serves as a finger grip and is flattened, and will maintain the alignment with the space between the arms 234 unless intentionally turned 90° when the stem and fork overlap in their closed portions. Thus, when locked together, the concentrate valve is drawn open for dispensing a mixture when the small valve 108 is opened by the push rod 144.

Whenever a chemically different concentrate is to be used, the gun can be purged with the dip tube 182 disconnected, or out of the container, or the head 218 can be manually retracted to permit runback of concentrate without disconnecting the hose before the purging. The L-member 207 can then be removed and the spool valve easily withdrawn and replaced by a spool to be dispensed, some elastomeric plastics not being affected by some concentrates, while other elastomeric plastics are not affected by other concentrates.

The spool valves 216 can be coded in color and interchanged with different seals on them so as to be impervious to particular concentrates used in the gun.

A mild effort coiled spring 240 interengaging the housing end wall 228 and the valve wall 246 urges the valve 222 initially to hold its closed position and cooperates with any vacuum condition developed by the static solute charge under gravity and with the jetflow of water when the valve is not actuated by the push rod, it having been noted that the area of the valve wall 246 is greater than that of the concentrate valve land 214 so that any drop in pressure in the large cylinder 204 will also predominately hold the valve 218 closed. Accordingly, even with the chamber 20 of the main housing open to atmosphere at all times, liquid will not pass the valve member 218 in either direction when closed, thereby preventing drip or dilution of the solute supply. During operation, the valve chamber is under subatmospheric pressure which is quite modest unless solvent alone is being dispensed, whereupon the negative gauge pressure becomes quite deep and strongly retains the valve closed.

PROPORTIONING AND MIXING

As noted, the valve compartment 202 empties into the chamber 20 where the jet pump unit 32 includes pumps 154 and 156 which are arranged within a unitizing shell 158 for ready interchangeability to handle different chemicals or provide different proportions. The exterior of the shell is spaced as much as possible from the substantially cylindrical wall of the chamber 20 in the housing as sealed at opposite ends with respect thereto by seals 158 to provide an appreciable space or holding reservoir 256 for a chemical concentrate. This reservoir 256 is open to atmosphere through the first stage gap and the diverging walls.

A common inlet to the jet pumps for the water is at 258 and the concentrate is supplied to the concentrate reservoir 256 through openings 191 from the nipples 188 as supplied from the concentrate bottle 176 through the disconnectable flexible hose 180 and dip tube 182 that minimize the height for the lift of the concentrate, as already described.

Each pump, referring to the second stage first (FIG. 4), generally includes an entrance such as 260 for water under pressure followed by converging walls 262 terminating in a throat 264 that converts pressure into jet flow energy. The jet passes a short distance through a gap 266 in contact with concentrate therein and leading therefrom is an opening 268 to a mixing cylinder or chamber 270 followed by diverging walls 272 which convert flow energy back to pressure. The diverging walls, at least the last one, can be dispensed with if a soft flow discharge is desired for the mixture. In the arrangement illustrated, the second stage jet pump 248 for large capacity extends the length of the pump chamber 20 and is offset radially and angularly sufficiently from the axis thereof to accommodate the first stage pump along the side of the converging throat 262 portion of the second stage.

The first stage pump 249 includes the entrance 261 for the water and converging walls 263, a jet gap 267 receiving the primary mixture, and a mixing chamber 269 ending in diverging walls 267. The gap 267 of the primary jet pump is in communication with the reservoir 256 to ingest concentrate therefrom.

A first dilution proportioning is thereby accomplished in the first stage jet pump and the final mixture proportioning is accomplished in the second stage jet pump by the arrangement of converging nozzles, gaps and diverging walls. Thus, the concentrate is first diluted and mixed with diluent at one ratio, or proportion, with little change in pressure; and that mixture, at no change in pressure, is further diluted and mixed for discharge at the outlet 26 of the housing in its final proportioning ratio through the nozzle 28 having a flow area substantially less than the water flow area ahead of the jet pump. Thereby, any degradation or porportioning is confined to the first stage which can be closely designed and it isolates the second stage against degradation since pressure and flow rate thereto are constant.

The action of the jet pumps, accordingly, provide a quite accurately proportioned mixture for dispensing through a fixed but interchangeable spray nozzle on the output end at water pressures that are well above 5 p.s.i.g. Below this pressure the springs and the valves in the valve chamber 18 act to prevent backflow, as already described, and the water chamber 18 is vented.

Stability and constancy of the mixture ratio throughout a wide range of water pressures above 10 p.s.i.g. is largely due to the relation of the molecular energy transfer interface area between the water jet and concentrate at the gaps, same being maximized and the skin friction of the mixing chamber wall surface upon concentrate flowing through it being minimized. The greater this accomplishment, the more constant the mixture ratio is over a wide range of municipal water pressures and wide range of proportions, the energized relative flow areas of the concentrate and the water jet determining the ratio introduced into the mixing cylinder.

SUMMARY

The phase "gauge pressure" or "p.s.i.g.", as employed herein, means a pressure above atmospheric or environmental pressure and is sometimes referred to specifically as positive gauge pressure.

From the drawings, the description relating thereto, and the appended claims, it will be appreciated that the advantages of the spray device include:

A. The jet pump provided having two or more stages for better accuracy and control of the proportioning ratios over the range of substantially all municipal water supply pressures;

B. The energy transfer process never creates any negative gauge pressure at the gap more than that essentially entailed in entraining the concentrate in the jetting water;

C. The variation of ratio with pressure changes in negligible over the range of pressure changes experienced with municipal water systems;

D. Wide open energy transfer chambers along with the full flow large tubing and fittings employed are not easily clogged by wettable powders, nor unduly restrictive to the passage of viscous concentrates;

E. The very high turbulence created by the energy transfer process within the energy converters assures homogenous blending of the output spray solution;

F. Wide specification limits are provided for water pressures from 10 to 100 p.s.i.g. with narrow ratio variations, and, with water temperatures as high as the material of the gun parts will permit. The preferred materials used are polypropylene, polyvinyl acetal resin, or the like, and synthetic seal materials selected with regard to the chemicals handled;

G. Quick-change matched jet pumps and nozzles enable a selectably up to 1 to 7 gallons-per-minute delivery in a housing having an internal diameter of 1 inch and flow area of ½ inch; mixture ratios up to 20:1 with a single stage jet pump and up to 200:1 with two-stage jet pumps; any cone spray up to 30° and the utilization of a mixture of any viscosity concentrate capable of flowing;

H. A thumb-operated valve provides instant and exact control of two different flow rates and also control of operation selectively with or without solutes;

I. Automatic flow cut-off overrides the thumb operation whenever input pressure is insufficient for satisfactory proportioning;

J. Extra large concentrate tubing and ports and manually full opening valves minimize any pressure drop, particularly on concentrates;

K. A slim-line gun dispenser is easy to grip with a balance hing-like wrist suspension of a concentrate container below it for minimal height lift;

L. Large mouth, one-gallon, or a half-gallon, container with open mouth, or vented, cap can be used for suspension including original shipping containers with concentrate already in them; and M. Extra large valve ports assure insignificant pressure loss through valves on flows up to 7.5 gallons-per-minute with a housing approximately 1 inch in diameter, internally.

N. The main valve can easily be opened against liquid pressure after preliminary opening of the pilot valve and once a solvent flow begins, the relative drop in pressure between the two valves due to the Bernoulli effect draws the main valve further open so that the valve space required for the two valves spaced is reduced to that required for a single valve that opens wide for minimal drop across the valve port and closes as a single valve with rapidity.

What is claimed is:

1. In a fluid mixture dispensing device having a housing defining a mixing compartment;
   manually controlled valve means for conducing solvent to said compartment;
   valve means for conducting solute to said compartment;
   solvent flow control valve means between said compartment manually controlled valve means biased to close at a comparatively low positive gauge pressure upon the solvent;
   negative gauge pressure responsive means normally closing said solute valve means under a negative gauge pressure; and
   manual means actuating the solvent valve means independently and the solute valve means selectively simultaneously therewith.

2. The device defined in claim 1 including jet pump means inducing said negative gauge pressure by flow of said solute at a pressure above said positive gauge pressure and mixing said solvent and solute in a solution of predetermined proportions.

3. The device defined in claim 2 in which said jet pump mixing means comprises:
   means conducting solvent at high pressure through converging walls and ejecting it as a column through a gap into a throat having a size greater than that of the column, and said solute valve means having its outlet connected to supply solute to said gap.

4. The device defined in claim 2 including a nozzle having a flow area substantially less than the water flow area ahead of the jet pump means.

5. The device defined in claim 1 including means for inducing said negative gauge pressure by flow of said solvent acting upon solute supplied through said solute valve means.

6. The device defined in claim 1 including a jet mixing pump in said mixing chamber establishing by operation of the positive gauge pressure upon the solvent valve a negative gauge pressure upon the solute valve.

7. In a mixture dispensing device having a mixing compartment;
   valve means for conducting solvent to said compartment above a comparatively low positive gauge pressure;
   valve means for conducting solute to said compartment at a mild negative gauge pressure;
   pressure responsive means for closing said solvent valve means at said low positive gauge pressure;
   negative gauge pressure responsive means for closing said solute valve means under negative gauge pressure;
   manual means for actuating the solvent valve means above said low pressure independently and the solute valve means selectively simultaneously therewith; and
   said solute valve means comprises a housing having an opening through one end, a spool valve having spaced heads received through said opening, conduit means connecting the space between the heads to said mixing means, said negative gauge pressure responsive means including a valve port element for supplying solute and closing said opening, one of said heads on its remote side when closed engaging said valve port element and being exposed through the valve port of predetermined size to the source of solute under said mild negative gauge pressure and the other head on its remote side being exposes to atmosphere over an effective area larger than said predetermined size, said one head being urged to close when said negative gauge pressure drops to a respective gauge pressure related to the restricted solute flow.

8. In a portable pressure-mixing and dispensing device the combination of a main housing having an inlet and an outlet with spaced chambers therebetween for solvent flow and for solution mixing, respectively;

manually controlled valve means between said solvent flow and mixing chambers to control flow of solvent therebetween above a predetermined low positive pressure including a valve closing in the direction of pressure flow at the outlet of the solvent chamber and a backflow check valve in the mixing chamber closing communication between the solvent and mixing chambers at pressures below said predetermined low positive pressure;

normally closed valve means for solute including a housing having a chamber with an outlet to said mixing chamber and connectable at its inlet to a source of solute;

mixing means in said mixing chamber for receiving solvent and solute from said respective valves; and manual means for controlling the solvent valve means and including a releasable connection for selectively controlling said solute valve simultaneously with the manual actuation of the solvent valve.

9. The combination called for in claim 8 including a mixing means aspirating a solute below gauge pressure, receiving a solvent under positive gauge pressure, said positive pressure being greater above gauge pressure than the aspirated solute below gauge pressure, and means for discharging the mixture to atmosphere.

10. In a device of the class described having contiguous housings side-by-side, defining compartments, on a housing having an inlet opening, conduit means interconnecting the compartments, an L-shaped conduit member having one end rotatable in said inlet opening for rotational adjustment in sealed relation through a predetermined angle with respect to the other housing with the other leg adapted to receive a supply tube thereon, the other end of the conduit member terminating in a valve port seat, a manually controlled valve member closing against said valve port, a mixing device in the other compartment supplied with solute through said conduit means, valve means in said other compartment for supplying solvent to said mixing device, and manually actuated means controlling said valve means and selectively controlling said valve member for opening the valve means and valve member simultaneously.

* * * * *